Patented Sept. 15, 1931

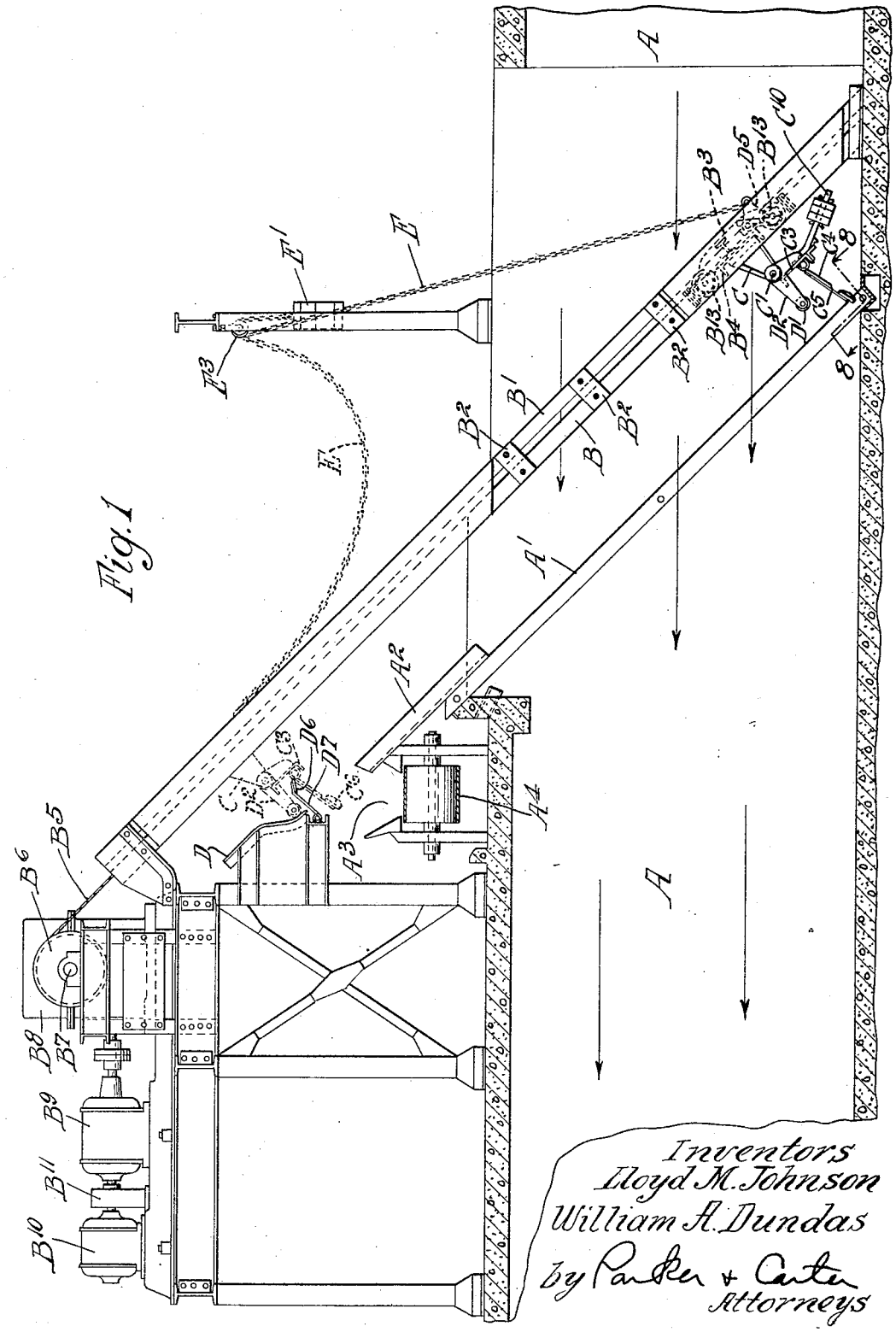

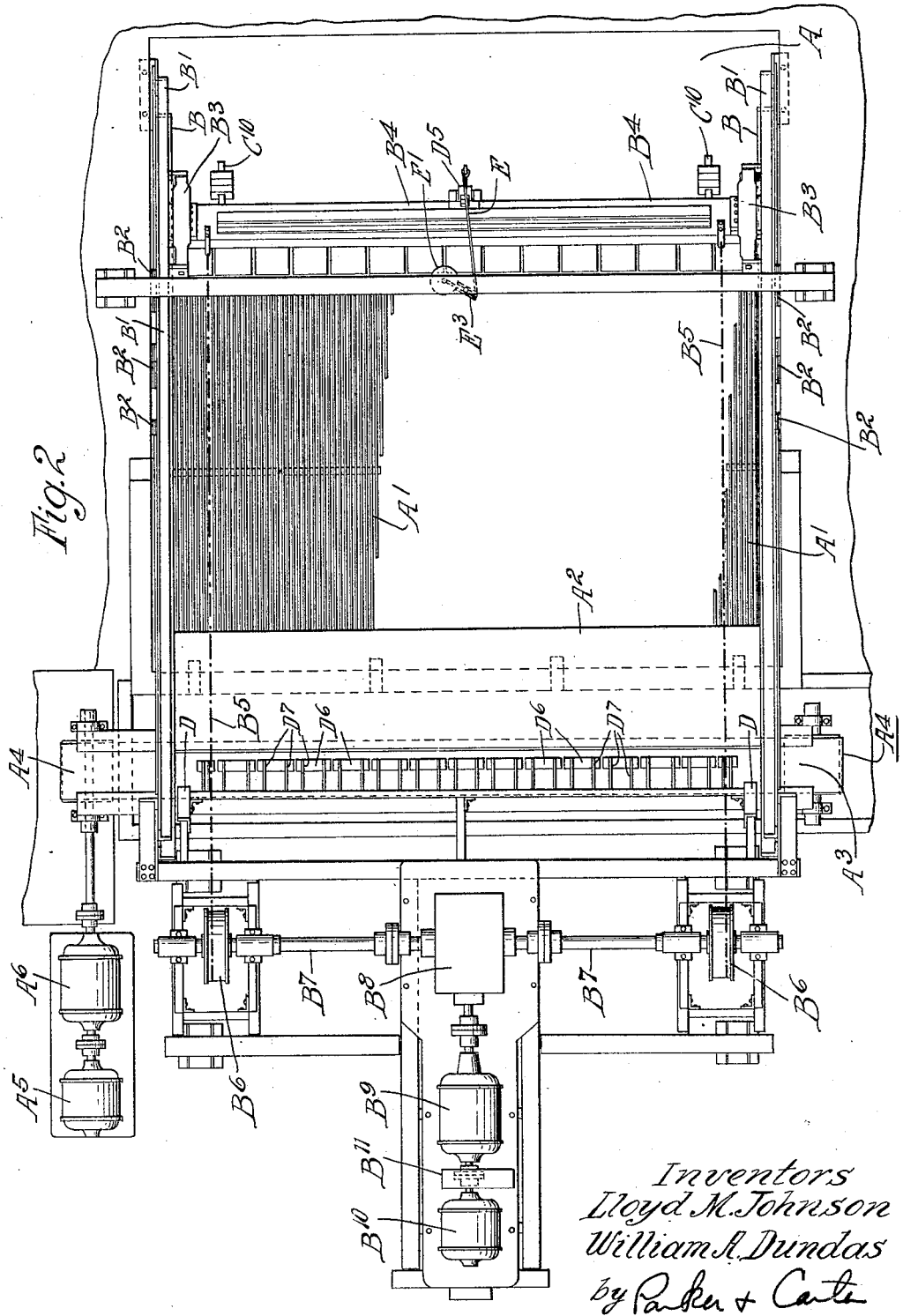

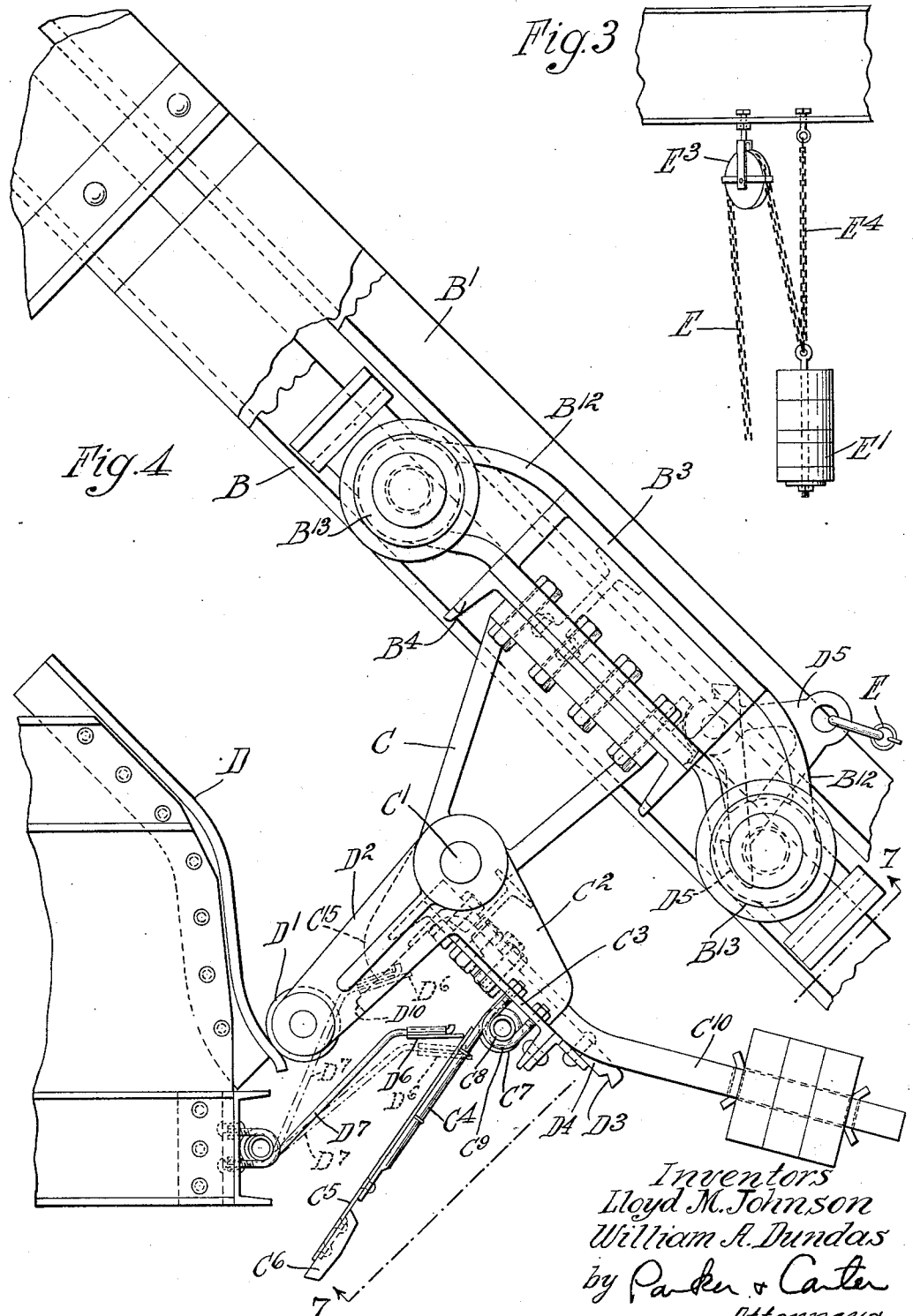
Sept. 15, 1931. W. A. DUNDAS ET AL 1,823,823
RACK SCREEN CLEANER
Filed March 5, 1929 6 Sheets-Sheet 3
Inventors
Lloyd M. Johnson
William A. Dundas
by Parker & Carter
Attorneys.

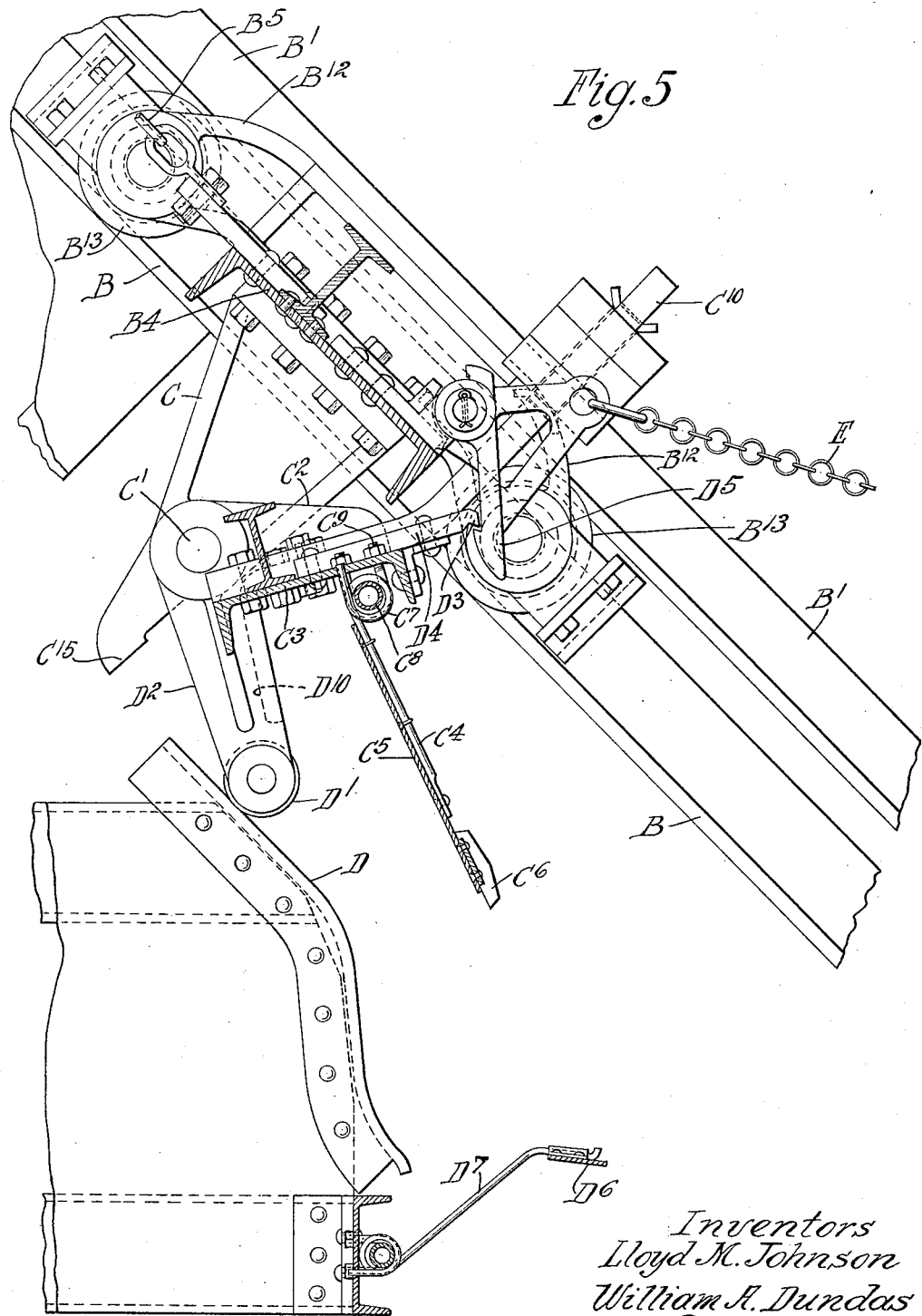

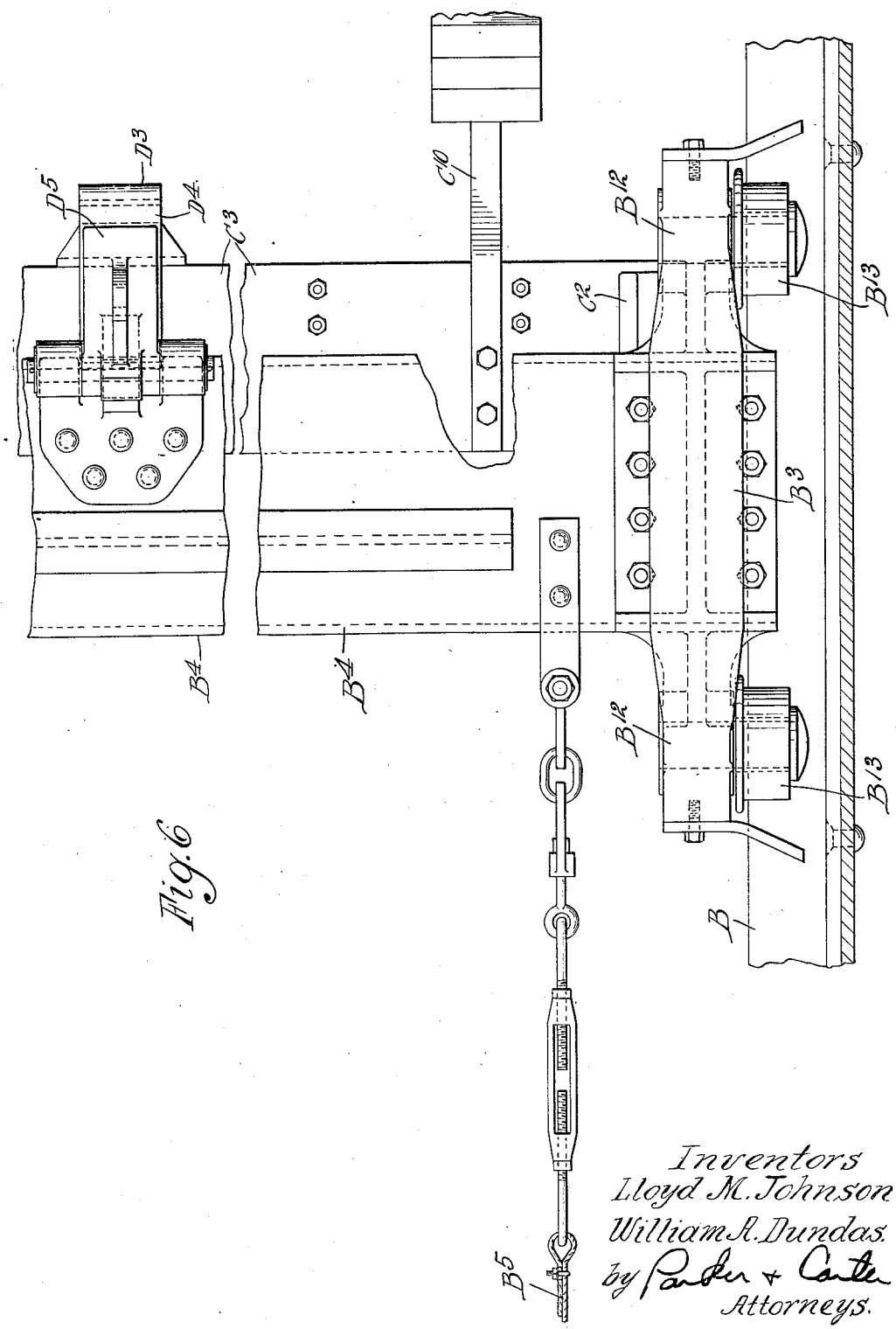

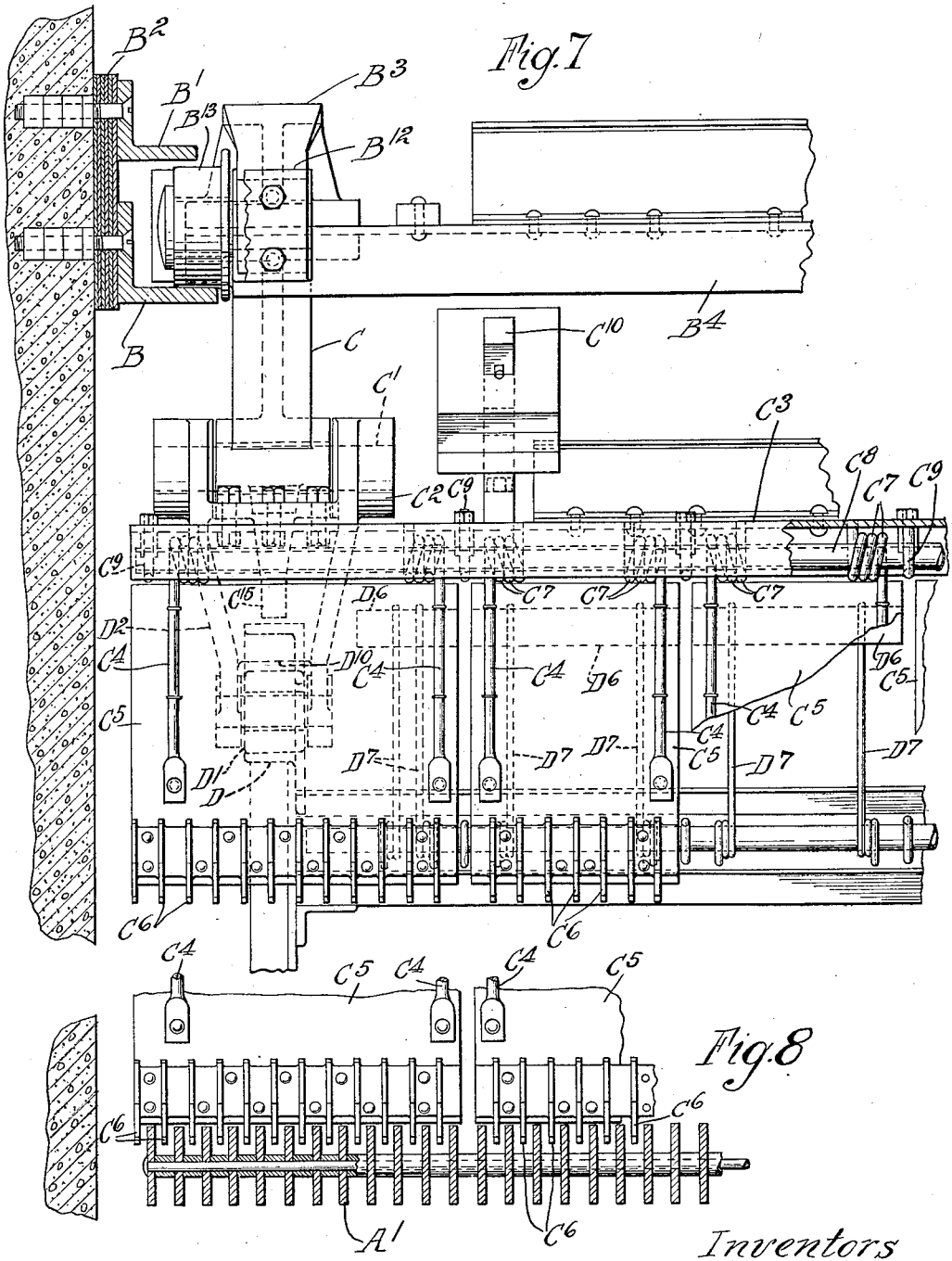

1,823,823

UNITED STATES PATENT OFFICE

WILLIAM A. DUNDAS AND LLOYD M. JOHNSON, OF CHICAGO, ILLINOIS

RACK SCREEN CLEANER

Application filed March 5, 1929. Serial No. 344,447.

Our invention relates to improvements in screens for sewage and the like and has for one object to provide in combination with a trash screen means for automatically cleaning the screen and for discharging the refuse material so cleaned from the screen. Another object of the invention is to provide a trash rack which will be flexible though positive in operation, exert to some extent a digging action which will be strong, durable and not subject to breakage and obstruction by presence of large pieces of trash. Other objects will appear from time to time throughout the specification and claims.

Our invention is illustrated more or less diagrammatically in the accompanying drawings, wherein—

Figure 1 is a side elevation in part section of the device;

Figure 2 is a plan view;

Figure 3 is a view of the counterweight;

Figure 4 is a side elevation showing the rake at the upper end of its excursion about to be tripped;

Figure 5 shows the rake in section after it has been tripped;

Figure 6 is a detail plan view of part of the rake;

Figure 7 is a section along the line 7—7 of Figure 4;

Figure 8 is a section along the line 8—8 of Figure 1.

Like parts are indicated by like characters throughout the specification and drawings.

A is the channel or passage through which dirt or trash laden water or sewage travels in the direction of the arrows. $A^1$ is an inclined trash screen or grid extending vertically across the channel and terminating at its upper end in a continuous fixed apron $A^2$ which discharges into the trough $A^3$ at the bottom of which is a conveyor belt $A^4$ adapted to carry off the material which is discharged into the trough. $A^5$ is a motor and $A^6$ a reduction gear by which the motor drives the conveyor belt $A^4$.

B is an angle track, there being one at each side of the channel mounted in the side walls thereof in front of the grid and parallel therewith. Associated with each track is a cover plate $B^1$. These tracks are rigidly mounted on the wall, there being packing members $B^2$ between them and the wall. Traveling on each of these tracks and held in place by the cover plate is a carriage $B^3$. The carriages are identical and a description of one will suffice for both. The carriage comprises a cradle member forwardly extended between its ends as at $B^{12}$ and at either end is a flanged roller $B^{13}$ so that the carriage does not rotate. Extending across between the two carriages is a rake beam $B^4$. This carriage and rake beam combination is free to travel along the tracks going down by gravity and being drawn up by cables $B^5$ extending parallel with the tracks and wound about the drums $B^6$ on drive shafts $B^7$ which are driven in turn through a gear box $B^8$, gear reduction boxes $B^9$ from the motor $B^{10}$. Associated with the motor $B^{10}$ is a solenoid brake $B^{11}$ to control the operation of the shaft driven thereby.

Projecting downwardly from the rake beam $B^4$ are pivot lugs C carrying pivot pins $C^1$ in pivotal engagement with hinge plates $C^2$ on a rake plate $C^3$. This rake plate $C^3$ carries a plurality of downwardly extending stiff spring arms $C^4$ which arms carry scraper plates $C^5$ which terminate in teeth $C^6$, there being one tooth adapted to penetrate between each pair of screen bars. These spring arms $C^4$ terminate in coil spring $C^7$ wound about a bar $C^8$ which is held in position on the plate $C^3$ by U-clamps $C^9$. Projecting forwardly from the plate $C^3$ at both ends are counterweight levers $C^{10}$ tending to hold the rakes and cleaning teeth down in the position shown in Figure 4 to work upon the screen but giving a considerable measure of flexibility so that in the event that the device should encounter anything which could not move, the rake would give and slide over and would not break.

At the upper end of the excursion of the rake above the trough $A^3$ is a trip track D adapted to be engaged by a roller $D^1$ on a lever $D^2$ associated with the rake so that as the carriage moves from the position shown in Figure 4 to the uppermost part shown in Figure 5, this lever is rotated to swing the plate C³ into the position shown in Figure 5 so that the dog D³ on the arm D⁴ extending from the plate will engage the pivoted pawl or latch D⁵ to lock the rake in the inoperative position. As the rake travels from the working position shown in Figure 4 to the inoperative position shown in Figure 5, the scraper blade D⁶ mounted on supporting springs D⁷ scrapes the underside of the blade and discharges any material which may be on it into the trough A⁴. C¹⁵ is a downwardly projecting stop in the lug C adapted to engage the swivel D¹⁰ of the lever D² in the position shown in Figure 4. As soon as the rake is tripped into the position shown in Figure 5, the mechanism is reversed and the carriage descends by gravity to its lowermost excursion as shown in Figure 1. At this time a tension is exerted by the chain E which springs the latch D⁵ and permits the counterweights to rotate the rake into the position shown at the bottom on Figure 1 causing a slight digging action at the bottom of its travel to insure digging out of any refuse which may be piled up at the bottom of the screen. The chain E is operated by a counterweight E¹ which is suspended by the chain as it passes over a pulley E³. The chain E⁴, adjustable in length is provided to limit the distance to which the counterweight may descend.

In operation the electric motor is controlled to cause the rake to have up and down or back and forth movement along the track. As it goes down it is retracted from and out of contact with the screen so that there is no tendency for refuse to be pushed down along the screen. At the end of its downward excursion the rake digs in to any refuse which may be piled in at the bottom when it is released by the latch which is a result of its downward stroke and it then comes up scraping any refuse found upon the screen which would not pass through upward and discharging it into the trough. When the rake is tripped any material which may have been deposited on the working face of the rake is scraped off and the rake therefore returns ready for another working stroke in a cleaned condition.

We claim:

1. In combination with a rack screen, a track parallel therewith, a carriage adapted to run along the track, a rake pivoted on the carriage, automatic means for holding the rake in engagement with the screen, means operative only at the upper end of the carriage excursion for moving the rake out of engagement with the screen, means operative only at the lower end of the carriage excursion for automatically throwing the rake into engagement with the screen, the means for throwing the rake into engagement with the screen comprising a latch associated with the carriage and a limiting member adapted to trip the latch when the carriage reaches the lower end of its excursion.

2. In combination with a rack screen, a track parallel therewith, a carriage adapted to run along the track, a rake pivoted on the carriage, automatic means for holding the rake in engagement with the screen, means operative only at the upper end of the carriage excursion for moving the rake out of engagement with the screen, means operative only at the lower end of the carriage excursion for automatically throwing the rake into engagement with the screen, the means for the throwing the rake out of contact with the screen comprising a cam, a lever associated with the rake adapted to engage the cam toward the upper end of the rake excursion and a latch adapted to hold the rake in the disengaged position.

3. The combination with an inclined trash screen of a rake, means for moving it upwardly therealong to scrape material toward the upper end thereof, an apron in continuation of the screen and a trough into which the rake may discharge material from the screen and across the apron, means for giving the rake a reciprocating movement, the excursion of which extends throughout the entire length of the screen, means for tripping the rake to cause it to return free of engagement with the screen, and means for latching the rake in the inoperative position prior to its free return.

4. The combination with an inclined trash screen of a rake, means for moving it upwardly therealong to scrape material toward the upper end thereof, an apron in continuation of the screen and a trough into which the rake may discharge material from the screen and across the apron, means for giving the rake a reciprocating movement, the excursion of which extends throughout the entire length of the screen, means for tripping the rake to cause it to return free of engagement with the screen, and means for latching the rake in the inoperative position prior to its free return, and means associated with the latching means for cleaning the rake.

5. In combination with a rack screen, a track parallel therewith, a carriage adapted to run along the track, means for moving said carriage, a rake pivoted on the carriage, automatic means for holding the rake in engagement with the screen, separate means additional to the track and to the carriage moving means operative only at the upper end of the carriage excursion for moving the rake out of engagement with the screen, means operative only near the lower end of the carriage excursion while the carriage is moving downwardly for automatically throwing the rake into engagement with the screen.

6. In combination with a rack screen, a track, parallel therewith, a carriage and means for reciprocating it along the track, a rake mounted on the carriage and movable thereon into and out of operative relation with the screen, separate means additional to the track and to the carriage moving means rendered operative by the downward movement of the carriage for moving the rake on the carriage into operative relation with the screen at the lower end of the carriage excursion and separate means additional to the track and to the carriage moving means for moving the rake on the carriage out of operative relation with the screen at the upper end of its excursion and means for holding the rake in whichever position it has been placed during its movement from one end to the other of its excursion, said means being additional to the track and to the carriage moving means.

Signed at Chicago, county of Cook and State of Illinois, this 28th day of February, 1929.

WILLIAM A. DUNDAS.
LLOYD M. JOHNSON.